US008933592B2

(12) United States Patent
Aiello

(10) Patent No.: US 8,933,592 B2
(45) Date of Patent: Jan. 13, 2015

(54) POWER SUPPLY CIRCUIT FOR REMOTELY TURNING-ON ELECTRICAL APPLIANCES

(75) Inventor: Natale Aiello, Trecastagni (IT)

(73) Assignee: STMicroelectronics S.R.L., Agrate Brianza (MB) (IT)

( * ) Notice: Subject to any disclaimer, the term of this patent is extended or adjusted under 35 U.S.C. 154(b) by 691 days.

(21) Appl. No.: 13/256,913

(22) PCT Filed: Mar. 17, 2010

(86) PCT No.: PCT/EP2010/053480
§ 371 (c)(1),
(2), (4) Date: Nov. 2, 2011

(87) PCT Pub. No.: WO2010/106113
PCT Pub. Date: Sep. 23, 2010

(65) Prior Publication Data
US 2012/0057379 A1    Mar. 8, 2012

(30) Foreign Application Priority Data
Mar. 20, 2009 (IT) .............................. TO2009A0214

(51) Int. Cl.
*H01H 47/00* (2006.01)
(52) U.S. Cl.
USPC .......................................................... 307/125
(58) Field of Classification Search
USPC .......................................................... 307/125
See application file for complete search history.

(56) References Cited

U.S. PATENT DOCUMENTS

| | | | |
|---|---|---|---|
| 4,500,923 A * | 2/1985 | Duvall et al. | 348/730 |
| 4,651,214 A | 3/1987 | Rodriguez-Cavazos | |
| 4,751,580 A | 6/1988 | Fitzgerald et al. | |
| 5,014,178 A | 5/1991 | Balakrishnan | |
| 5,581,453 A | 12/1996 | Ueta et al. | |
| 5,812,385 A | 9/1998 | Leu | |
| 2002/0125867 A1 | 9/2002 | Choo et al. | |
| 2006/0198167 A1 | 9/2006 | Nakamura | |
| 2010/0148591 A1* | 6/2010 | Lim | 307/125 |
| 2010/0194358 A1* | 8/2010 | Stanford-Clark | 323/234 |
| 2011/0001651 A1 | 1/2011 | Candelore et al. | |
| 2011/0001887 A1 | 1/2011 | Shintani et al. | |

FOREIGN PATENT DOCUMENTS

| | | |
|---|---|---|
| DE | 197 44 548 | 9/1998 |
| DE | 42 37 634 | 5/2004 |
| EP | 0632563 A2 | 1/1995 |
| EP | 0 651 310 | 5/1995 |
| EP | 1 239 577 | 9/2002 |

OTHER PUBLICATIONS

International Search Report and Written Opinion dated Jan. 27, 2011 from corresponding International Application No. PCT/EP2010/053480.

* cited by examiner

Primary Examiner — Robert L. Deberadinis
(74) Attorney, Agent, or Firm — Allen, Dyer, Doppelt, Milbrath & Gilchrist, P.A.

(57) ABSTRACT

A power supply circuit for an electrical appliance, including a turning-on stage configured for determining a transition from a turned-off state, in which the power supply circuit is off and does not supply electric power, to a turned-on state of the power supply circuit. The turning-on stage includes a transducer of the remote-control type configured for triggering the transition in response to the reception of a wireless signal.

26 Claims, 6 Drawing Sheets

US 8,933,592 B2

POWER SUPPLY CIRCUIT FOR REMOTELY TURNING-ON ELECTRICAL APPLIANCES

CROSS REFERENCE TO RELATED APPLICATIONS

This application is a U.S. National stage patent application based on PCT Application Number PCT/EP2010/053480, filed on Mar. 17, 2010, entitled POWER SUPPLY CIRCUIT FOR REMOTELY TURNING-ON ELECTRICAL APPLIANCES, which application claims the priority benefit of Italian Patent Application Number TO2009A000214, filed on Mar. 20, 2009, entitled POWER SUPPLY CIRCUIT FOR REMOTELY TURNING-ON ELECTRICAL APPLIANCES, which applications are hereby incorporated by reference to the maximum extent allowable by law.

TECHNICAL FIELD

The present invention relates to a power supply circuit for remotely turning-on electrical appliances and more in particular to a switch-mode power supply (SMPS).

BACKGROUND ART

As is known, many electrical or electronic appliances, such as for example television sets, radios, and hi-fi systems, envisage a low-consumption mode of operation, referred to as "stand-by mode". In this mode, the electrical appliance is inactive as regards normal operation (for example, display of images for a television set, sound reproduction for hi-fi equipment, etc.) but can be controlled in switching-on through a remote control. As is generally known, an electrical appliance in stand-by mode is in any case supplied through the electric-supply mains, such as domestic power, or battery and consumes energy. The energy consumption is due to the presence of a microcontroller and a sensor connected to the microcontroller, configured for receiving and processing possible commands issued by remote control and supplied for this purpose. Considerable efforts have been made in the last few years to limit current consumption in stand-by mode of electrical appliances, which, so far, generally have levels of consumption of a few watts. However, it is evident that, if the consumption in stand-by mode of a plurality of electrical appliances generally present in dwellings is considered, non-negligible daily consumption levels may be reached.

FIG. 1 shows by means of a block diagram a portion of an electrical appliance 1 (in what follows the portion being referred to as a whole as electrical appliance 1) comprising a power supply circuit 4 (more in particular, a switch-mode power supply circuit SMPS) designed to guarantee operation in stand-by mode of a microcontroller 5 and of a command sensor 6 connected to the microcontroller 5 of the electrical appliance 1. The electrical appliance 1 comprises a supply port 2, which is connected, for example, to the supply mains or to a battery (not illustrated) and receives at input a supply voltage $V_{AL}$. The supply voltage $V_{AL}$ is hence supplied in input to the power supply circuit 4, which supplies the microcontroller 5 both during the normal operating mode and in stand-by mode. In particular, in stand-by mode the microcontroller 5 should be switched on and be able to process possible commands (for example, the command for switching on the electrical appliance 1) issued via a remote control 7 and detected by the command sensor 6. The electrical appliance 1 moreover comprises a supply switch 8, arranged between the supply port 2 and the power supply circuit 4, configured so as to be operated in conduction or interdiction. The switch 8 may, for example, be a main switch of the electrical appliance 1. If the supply switch 8 is operated in conduction (i.e., it is closed), the power supply circuit 4 and the microcontroller 5 are supplied during the stand-by mode; instead, if the supply switch 8 is operated in interdiction (i.e., it is open), the power supply circuit 4 and the microcontroller 5 are not supplied, and the stand-by mode cannot be activated. In the latter case, the electrical appliance 1 is effectively turned off and cannot be switched on via the remote control 7.

FIG. 2 shows a possible embodiment, of a known type, of the power supply circuit 4. In particular, the power supply circuit 4 is of a flyback type.

If the power supply circuit 4 is supplied by means of an AC supply voltage $V_{AL}$, it is advisable to connect a rectifier 9, for example a diode rectifier bridge and a filter capacitor, cascaded to the supply port 2, in order to generate in use a DC working voltage $V_1$.

The DC working voltage $V_1$ is then supplied in input to a primary winding 12 of a transformer 11. The primary winding 12 comprises a first terminal 12' connected to the rectifier 9 and a second terminal 12". The second terminal 12" is connected in series to a drain terminal D of a switching transistor 15, for example a MOSFET device, which is in turn connected, through its own source terminal S, to a ground reference voltage GND. Furthermore, the second terminal 12" of the primary winding 12 is connected in series to a drain terminal D of a turn-on transistor 16, being, for instance, a MOSFET device. The turn-on transistor 16 is connected, via an own source terminal S, to a turn-on capacitor 18, which is in turn connected to a ground reference voltage GND.

The switching transistor 15 and the turn-on transistor 16 are controlled in conduction and interdiction by a driving circuit 19. The driving circuit 19 is moreover connected, through a supply port thereof, to the turn-on capacitor 18, from which it receives the supply during its turning-on step. The supply port of the driving circuit 19 is moreover connected, via a rectifier diode 22, to an auxiliary winding 21 of the transformer 11, which supplies the driving circuit 19 during use, after the turning-on step. Furthermore, a turn-on resistor 23 may be present, connected between a gate terminal G of the turn-on transistor 16 and the second terminal 12" of the primary winding 12.

Finally, the transformer 11 comprises a secondary winding 24 for generating on an output port of the power supply circuit 4 an output voltage $V_{OUT}$ that supplies the microcontroller 5.

In the operating condition in which the electrical appliance is turned off (the supply switch 8 is open), the turn-on capacitor 18 is discharged and the driving circuit 19 is turned off. Closing of the supply switch 8 does not cause immediate turning-on of the driving circuit 19, but generates a passage of current from the supply port 2 through the primary winding 12 and through the turn-on transistor 16, which in turn charges the turn-on capacitor 18. The turn-on transistor 16 is driven in conduction by means of the turning-on resistor 23, which develops, after closing of the supply switch 8, the biasing necessary for switching on (conduction state) the turn-on transistor 16.

When the voltage on the turn-on capacitor 18 reaches a value $V_C$ sufficient to supply the driving circuit 19, the driving circuit 19 turns on and drives the turn-on transistor 16 in interdiction and the switching transistor 15 in conduction. The driving circuit 19 is hence supplied by the auxiliary winding 21.

The turn-on transistor 16 and the turn-on resistor 23 form a turn-on circuit 29 of an active type, operated in order to pre-charge the turn-on capacitor 18 for turning on the driving circuit 19. Following upon closing of the supply switch 8, the electrical appliance 1 can switch to a normal operating mode or to a stand-by mode, awaiting a command (for instance, via the remote control 7) by a user.

Both during the normal mode of use and in the stand-by mode, the switching transistor 15 is operated by the driving circuit 19, for example via a square-wave modulation (pulse-width modulation—PWM) signal, with a frequency usually higher than 16 kHz, and enables to transfer the supply needed for operation of the microcontroller 5 to the secondary winding 24. Consequently, also in stand-by mode the driving circuit 19 is constantly supplied in order to drive the switching transistor 15 appropriately for supply of the microcontroller 5.

Hence, it is evident that the stand-by mode generates an energy consumption that is constant and significant over time on account of the need for supply of the driving circuit 19 and the microcontroller 5.

A possible solution for eliminating the energy consumption in stand-by mode consists in turning off the electrical appliance 1 via the main supply key 8 (however, not always present) or removing the supply physically from the electric-supply mains. These solutions, however, entail the loss of the convenience and practicality of having a complete control of the electrical appliance via remote control.

SUMMARY OF THE INVENTION

One aim of the present invention is to provide a power supply circuit free from the limitations described.

According to one embodiment of the present invention it is provided a power supply circuit for an electrical appliance, comprising a turning-on stage configured for determining a transition from a turned-off state, wherein said power supply circuit is off and does not supply electric power, to a turned-on state of said power supply circuit, characterized in that said turning-on stage comprises a transducer, of a remote-controlled type, configured for triggering said transition in response to a reception of a wireless signal.

BRIEF DESCRIPTION OF THE DRAWINGS

For a better understanding of embodiments of the present invention, a preferred embodiment thereof is now described, purely by way of non-limiting example and with reference to the annexed drawings, wherein.

DETAILED DESCRIPTION

Figure 1:
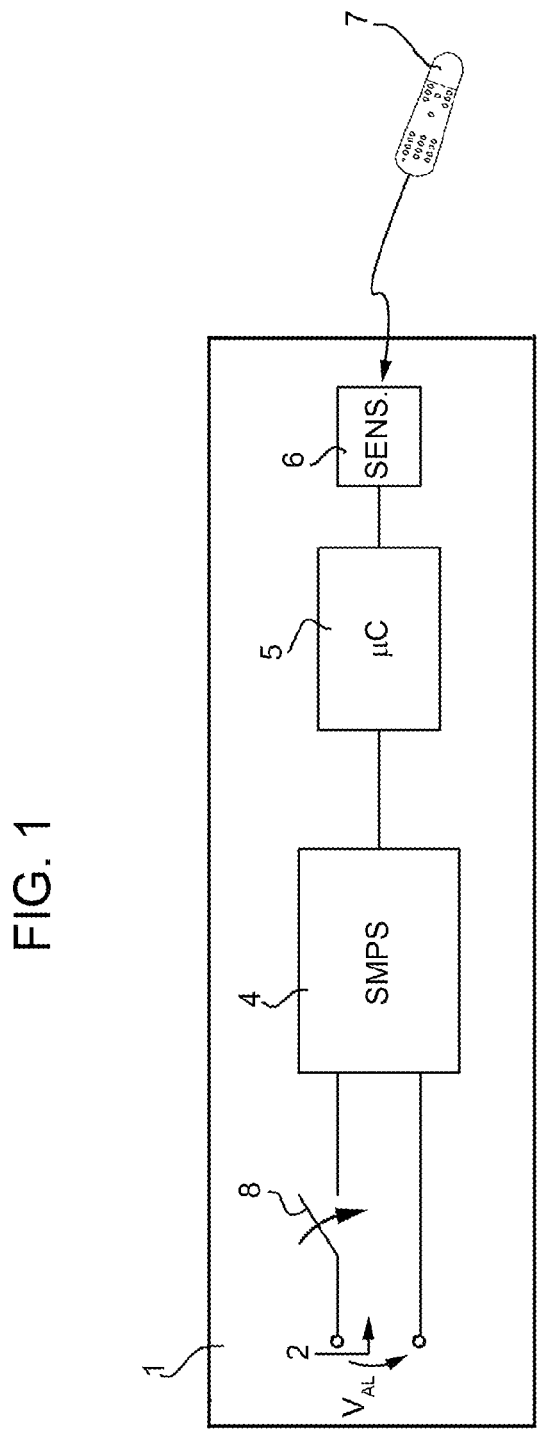
FIG. 1 shows a block diagram of a portion of an electrical appliance comprising a power supply circuit for remotely turning-on the electrical appliance.
Figure 2:
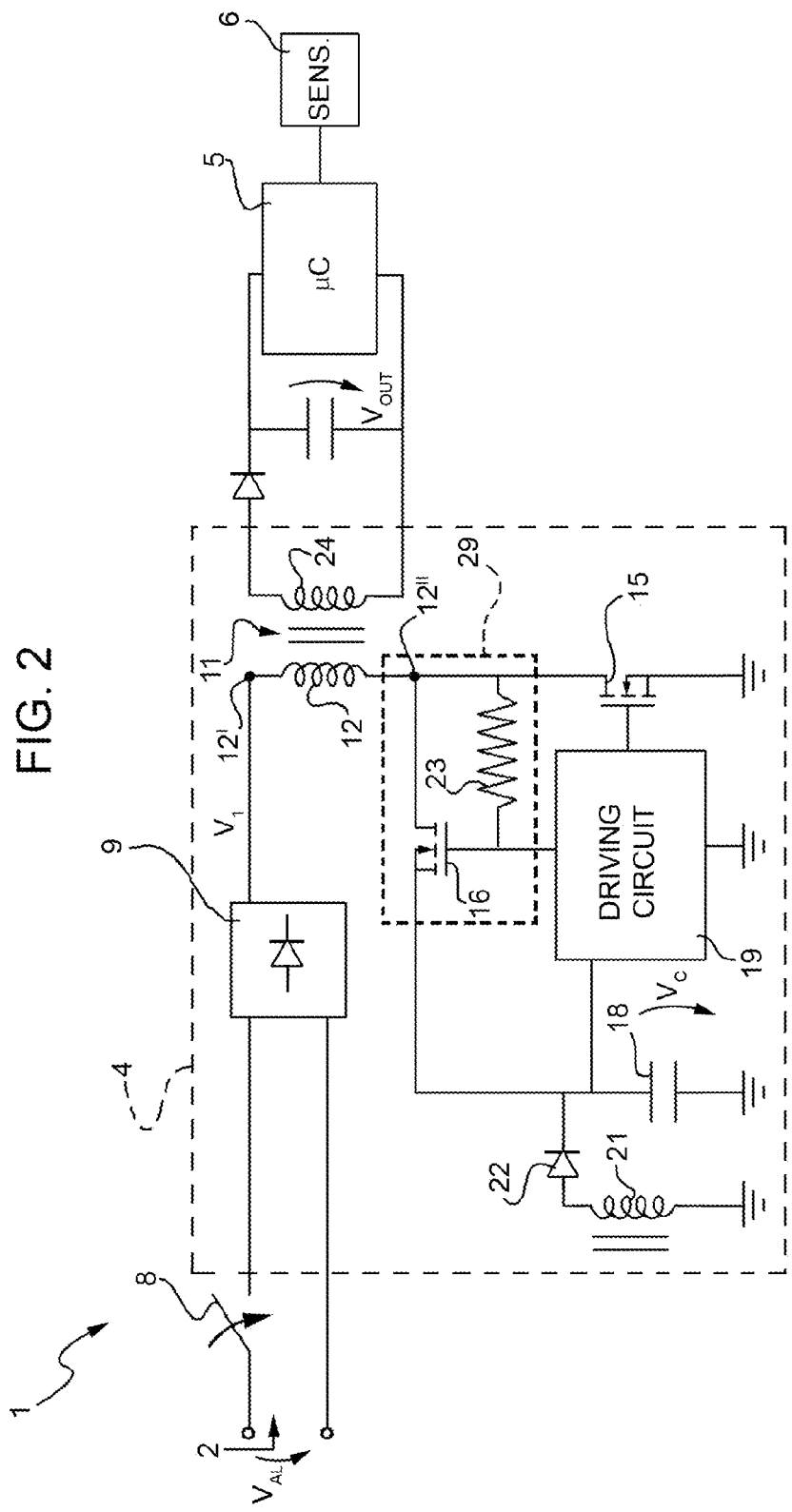
FIG. 2 shows a switch-mode power supply circuit of a known type for managing remote turning-on of an electrical appliance.

For simplicity of description, reference will be made to a power supply circuit of a flyback type, similar to the one illustrated in FIG. 2; however, other types of supply circuits can be implemented, for example, a converter of a boost type, a forward type, a resonant type, or some other type.

Figure 3:
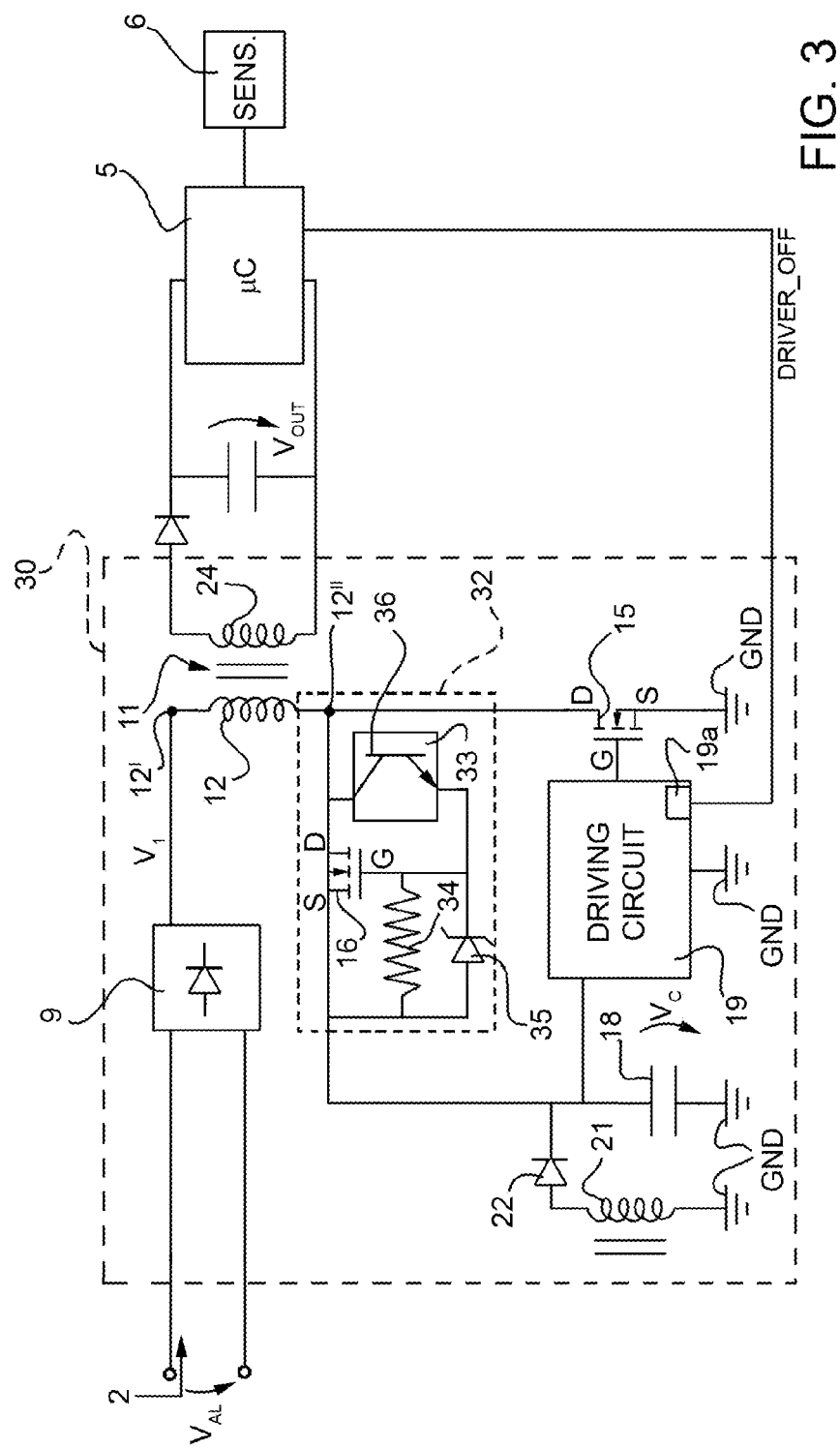
FIG. 3 shows a power supply circuit according to an embodiment of the present circuit, for managing remote turning-on of an electrical appliance.

FIG. 3 shows a power supply circuit 30, in particular a switch-mode power supply (SMPS) circuit of a flyback type. Elements of the power supply circuit 30 of FIG. 3, analogous to and having substantially the same function of the ones described with reference to the power supply circuit 4 of FIG. 2, will not be described any further herein. The power supply circuit 30 comprises a turn-on circuit 32 that can be activated remotely.

The turn-on circuit 32 comprises a turn-on transistor 16 similar to the one described with reference to FIG. 2. However, in this case the gate terminal G of the turn-on transistor 16 is not directly connected to, and controlled by, the driving circuit 19.

The turn-on circuit 32, which can be connected indifferently to the first terminal 12' or to the second terminal 12", further comprises a transducer 33, which can be remote-controlled and is configured to enable, when activated, passage of a current through it. The transducer 33 is connected between the drain terminal D of the turn-on transistor 16 and the gate terminal G of the turn-on transistor 16.

The transducer 33 can be a photodiode, a photomultiplier or a phototransistor, configured so as to enable passage of a current across its terminals if activated by a light beam at a particular wavelength or within a range of wavelengths. Furthermore, the transducer 33 can be formed by a plurality of photodiodes or photomultipliers or phototransistors connected in series one another.

Finally, the turn-on circuit 32 comprises a turn-off resistor 34, preferably having a resistance comprised between 100 kΩ and 2 MΩ, connected between the gate terminal G of the turn-on transistor 16 and the source terminal S of the turn-on transistor 16; and a Zener diode 35, connected between the gate terminal G of the turn-on transistor 16 and the source terminal S of the turn-on transistor 16, in parallel to the turn-off resistor 34, and having a Zener voltage $V_{ZENER}$ preferably of 30 V.

For simplicity of description, in what follows reference will be made to a transducer 33 of an optical/electrical type, more precisely a phototransistor 36. The phototransistor 36 is activated by means of an incident light beam, preferably not visible by the human eye and having, for example, a wavelength in the infrared (greater than 700 nm) or in the ultraviolet (less than 400 nm). The light beam may be generated by a user through a remote control (shown in) configured for generating such a light beam.

In use, when the phototransistor 36 is driven in conduction (by means of an incident light beam having, for example, a wavelength in the infrared), a current flows through it and a voltage develops across its terminals, biasing the gate terminal G of the turn-on transistor 16. If the biasing voltage generated is higher than the conduction threshold of the turn-on transistor 16, the turn-on transistor 16 turns on, connecting the supply port 2 with the turn-on capacitor 18, through the rectifier 9 and the primary winding 12 of the transformer 11. In this way, the turn-on capacitor 18 is charged and, when the voltage on the turn-on capacitor 18 reaches a value $V_C$ sufficient to supply the driving circuit 19, the driving circuit 19 turns on and drives in conduction the switching transistor 15. Hence, the driving circuit 19 is supplied by the auxiliary winding 21.

In order to guarantee turning-on of the driving circuit 19, it is expedient for the turn-on transistor 16 to be driven in conduction by the phototransistor 36 (which, in turn, is driven in conduction by the incident light beam generated by the user) for a time sufficient to charge the turn-on capacitor 18. When a voltage $V_C$, sufficient to supply the driving circuit 19, establishes on the turn-on capacitor 18, the driving circuit 19 switches on.

The current that the phototransistor 36 generates, when it is activated by the incident light beam, is not very high. In particular, in the case of use of a turn-on transistor 16 having a gate capacitance of few nF (nanofarads), it is sufficient for the phototransistor 36 to generate a few tens of µA (microampere). In this case, the supply voltage $V_C$ of the driving circuit 19 is reached in a time of the order of a few hundreds of milliseconds, practically negligible for human perception.

The turn-off resistor 34 has the function of draining a possible leakage current of the phototransistor 36, for example caused by undesirable components of a light signal (e.g., natural light) accidentally incident on the phototransistor 36. Moreover, the turn-off resistor 34 favors the switching-off (interdiction state) of the turn-on transistor 16, draining the charge possibly accumulated on the gate terminal G of the turn-on transistor 16 during its operative state. The Zener diode 35 has the function of limiting the potential applied to the gate terminal G of the turn-on transistor 16 to a maximum value represented by the Zener voltage $V_{ZENER}$, proper to the Zener diode 35. In this way, saturation in conduction of the turn-on transistor 16 is prevented.

After the turning-on step, the driving circuit 19 controls in conduction the switching transistor 15. In this way, a current flows through the primary winding 12 of the transformer 11 and supplies, via the auxiliary winding 21, the driving circuit 19 itself. In use, the switching transistor 15 can be controlled via a square-wave modulation (pulse-width modulation~PWM) signal with variable frequency, usually higher than 16 kHz, and enables transfer onto the secondary winding 24 of the supply for operation of the microcontroller 5.

Turning-off of the power supply circuit 30 can be advantageously managed by the microcontroller 5. For example, driving circuits 19 are known provided with a turn-off input 19a. In this case, the microcontroller 5 is connected to said turn-off input 19a for turning-off the driving circuit 19 through a signal Driver_OFF, and consequently turning off the power supply circuit 30. In fact, in the absence of an appropriate light beam incident on the active area of the phototransistor 36, the turn-on transistor 16 is controlled in interdiction, and, after turning-off of the driving circuit 19, also the switching transistor 15 is controlled in interdiction. Consequently, in the absence of supply, the power supply circuit 30 turns off.

As an alternative to the turning-off command by means of the signal Driver_OFF managed by the microcontroller 5, there can be provided an appropriate circuit (not illustrated) for discharging of the turn-on capacitor 18 and for interrupting the supply of the driving circuit 19 managed by the microcontroller 5. Or, yet again, the microcontroller 5 could drive in interdiction the switching transistor 15, interrupting the flow of current through the primary winding 12 of the transformer 11.

The power supply circuit 30 can be supplied by a mains supply, such as domestic power, or by a battery. In the case of battery supply, however, the power supply circuit 30 does not require the rectifier 9.

Finally, a main switch of the electrical appliance in which the power supply circuit 30 is implemented (analogous to the supply switch 8 illustrated in FIG. 2), connected between the supply port 2 and the transformer 11, is not necessary. In fact, in the off state of the power supply circuit 30 (i.e., in the state in which the power supply circuit 30 does not provide electrical supply), the turn-on transistor 16, the switching transistor 15, and the transducer 33 are interdicted and do not conduct any current. The power supply circuit 30 performs itself the function of main switch of the electrical appliance in which it operates.

Figure 4:
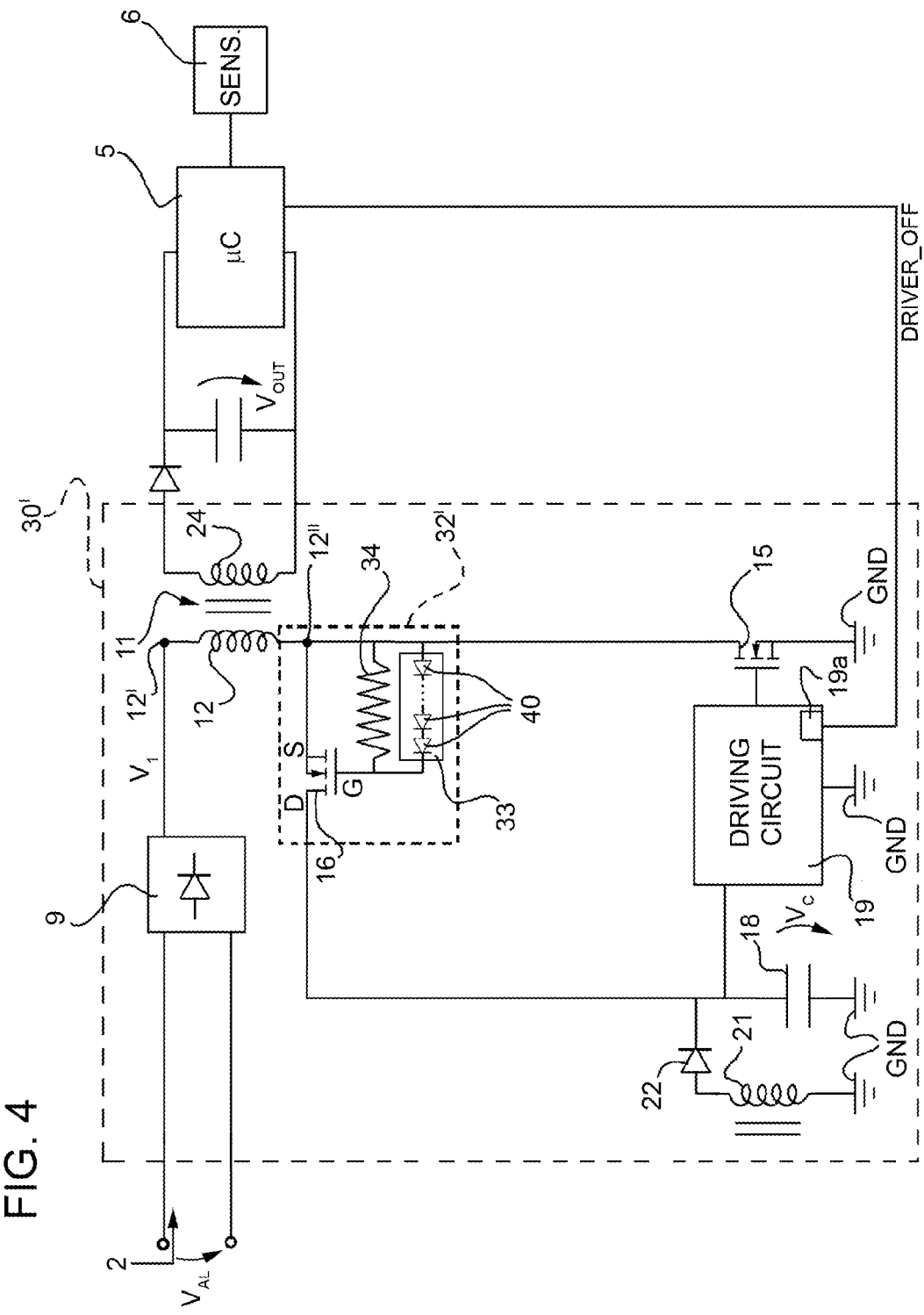
FIG. 4 shows a power supply circuit according to a further embodiment of the present circuit, for managing remote turning-on of an electrical appliance.

FIG. 4 shows a power supply circuit 30' according to a further embodiment of the present disclosure. Elements of the power supply circuit 30' of FIG. 4 analogous to and having substantially the same function of elements described with reference to the power supply circuit 30 of FIG. 3 are not further described herein.

In the embodiment of FIG. 4, the power supply circuit 30' comprises a turn-on circuit 32' that can be activated remotely, as already explained with reference to FIG. 3. The turn-on circuit 32' can be connected indifferently to the first terminal 12' or to the second terminal 12" (FIG. 4 shows the turn-on circuit 32' connected to the second terminal 12") and comprises the turn-on transistor 16, the transducer 33 and the turn-off resistor 34. However, unlike the embodiment of FIG. 3, the second terminal 12" of the primary winding 12 is connected in series to a source terminal S of the turn-on transistor 16. The turn-on transistor 16 is connected, through its own drain terminal D, to the turn-on capacitor 18, which is in turn connected to a ground reference voltage GND. The turn-off resistor 34 is connected in parallel to the transducer 33, i.e. one of its terminal is connected to the gate of the turn-on transistor 16 and the other terminal is connected to the source terminal S of the turn-on transistor 16 (which corresponds, in FIG. 4, to the second terminal 12").

The transducer 33 is remote-controlled and is configured to enable, when activated, passage of a current through it. The transducer 33 is connected between the source terminal S of the turn-on transistor 16 and the gate terminal G of the turn-on transistor 16. The transducer 33 according to the embodiment of FIG. 4 is formed by a plurality of photodiodes connected in series one another. However, a single photodiode may be used, provided that, during activation, it generates across its terminals a voltage sufficiently high to control in conduction the turn-on transistor 16. For example, in case the turn-on transistor 16 is a MOSFET device, the voltage is sufficiently high when the gate terminal G of the MOSFET device 16 is polarized above the MOSFET threshold voltage value for conduction channel formation.

The transducer 33 of FIG. 4 may be activated by means of an incident light beam (generated by a user through a remote control) preferably in the infrared range. As known, a photodiode is configured to generate, when illuminated, current carriers (electrons/holes). In particular, the current carrier generation causes a direct polarization of each photodiode 40, which develops across its terminals a voltage higher than its conduction threshold voltage, for example a voltage of about 600-700 mV. In this way, during use, the current through the photodiodes 40 is almost completely due to the incident light beam, and proportional to the incident light intensity. In absence of incident light beam, each photodiode 40 develops a voltage across its terminals which is lower than its conduction threshold voltage (and current substantially equal to zero).

Figure 5:
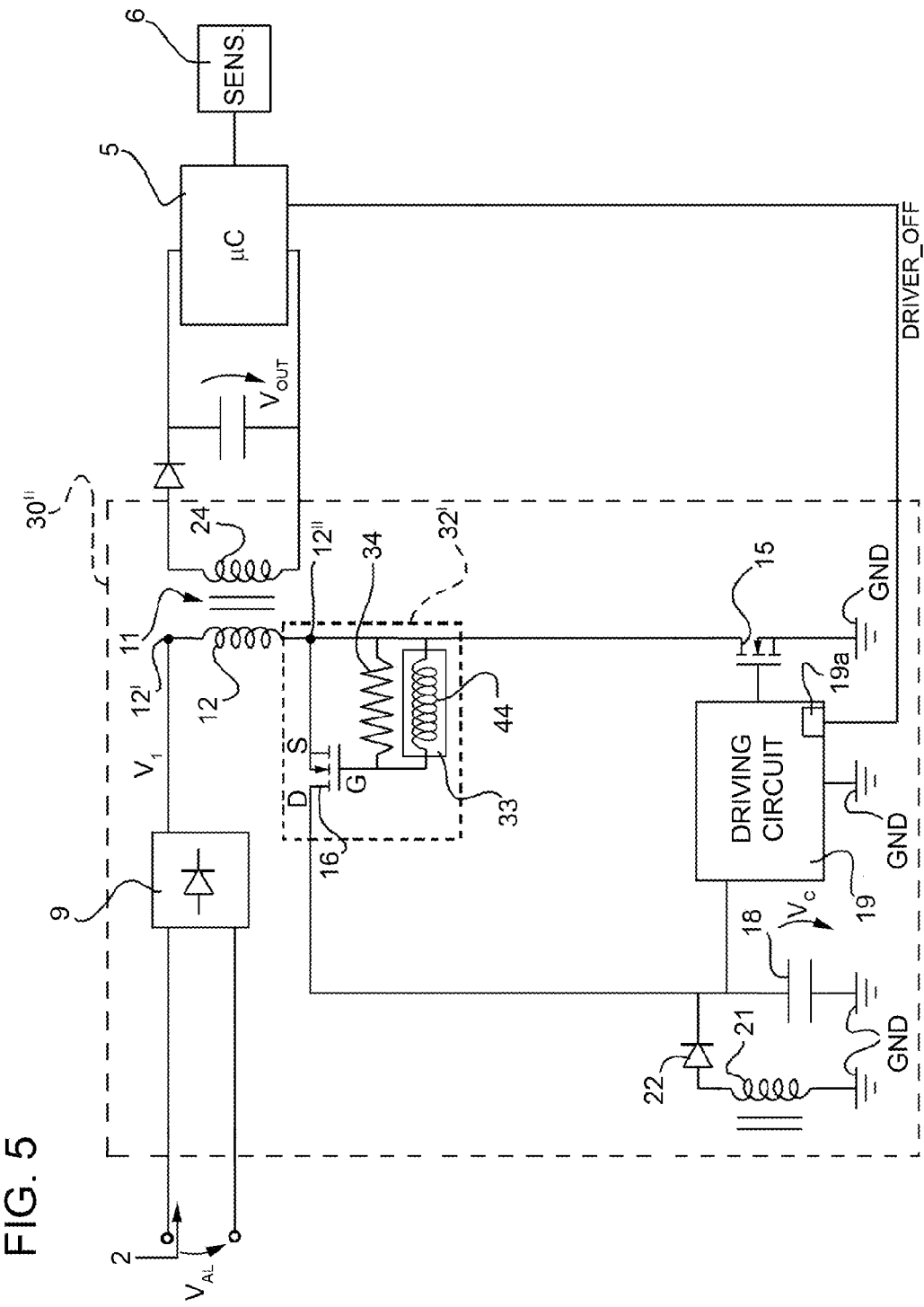
FIG. 5 shows a power supply circuit according to a further embodiment of the present circuit, for managing remote turning-on of an electrical appliance.

FIG. 5 shows a power supply circuit 30" according to a further embodiment of the present disclosure. Elements of the power supply circuit 30" of FIG. 5 analogous to and having substantially the same function of elements described with reference to the power supply circuit 30 of FIG. 3 or power supply circuit 30' of FIG. 4 are not further described herein.

According to the embodiment of FIG. 5, the transducer 33 is connected in the same way as already described with reference to FIG. 4. However, the transducer 33 comprises an antenna 44 (e.g., a patch antenna) connected between the source S and gate G terminals of the turn-on transistor 16. When no activation signal is provided to the antenna 44, the source S and gate G terminals of the turn-on transistor 16 are short-circuited and thus the turn-on transistor 16 is off (i.e., it has an open circuit behavior and no current flows through it). However, when an electromagnetic signal (generated by a user through a remote control) is provided to the antenna 44 so as to induce a current flow through the antenna 44, a voltage develops between the source S and gate G terminals of the turn-on transistor 16. By configuring the antenna 44 (e.g., by providing a sufficient number of turns) so that the voltage developed across the antenna 44 is higher that the conduction threshold voltage of the turn-on transistor 16, for example a voltage of about 600-700 mV, it is possible to control in an on-state the turn-on transistor 16.

The advantage of the embodiments of FIG. 4 and FIG. 5, with respect to the embodiment of FIG. 3, is that high voltage structures are not used.

Figure 6:
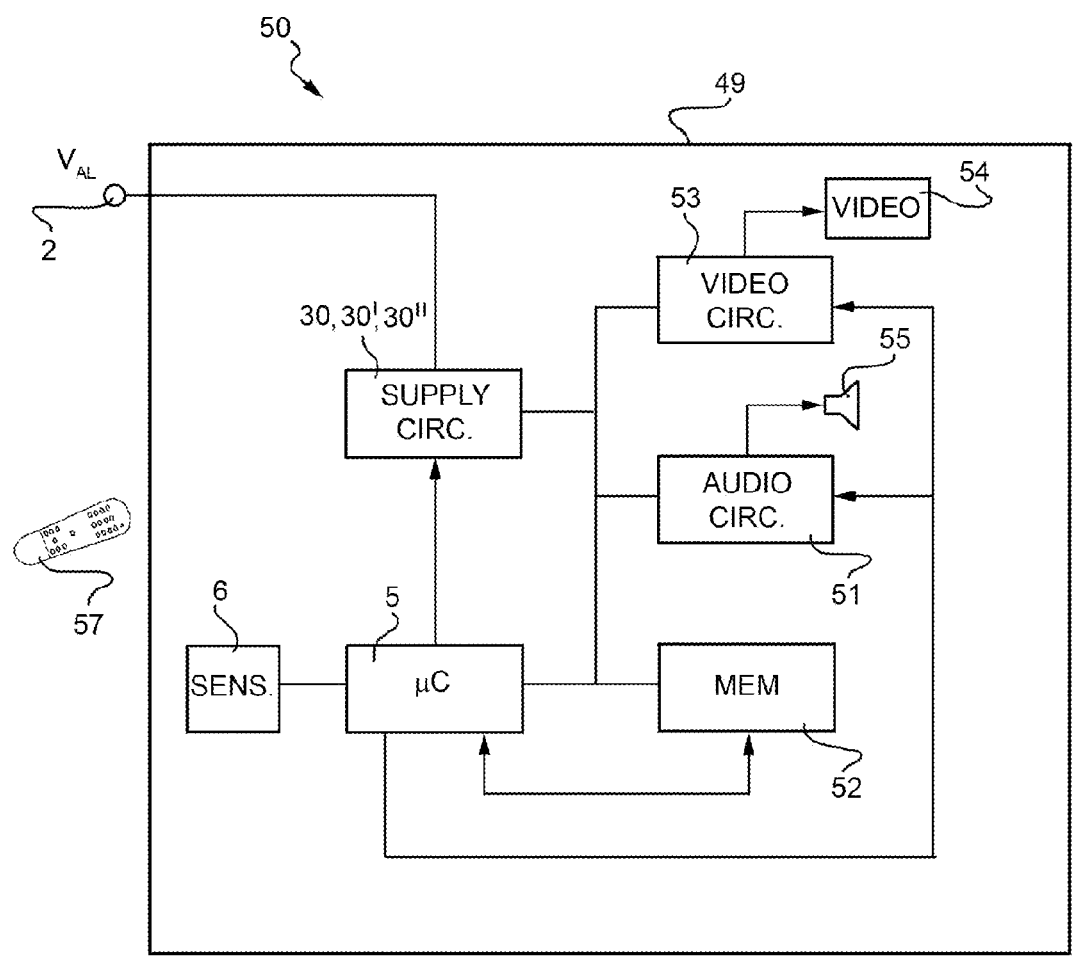
FIG. 6 shows a functional block diagram of an electrical appliance that implements the power supply circuit of any one of FIGS. 3 to 5.

FIG. 6 shows a block diagram of a system 50 comprising an electrical appliance 49 and a remote control 57. By means of the remote control 57, the electrical appliance 49 can be remotely controlled for being turned on and turned off. The electrical appliance 49 may, for example, be an audio/video system such as a television set, a hi-fi system, a video recorder, or an electrical household appliance in general, which implements the power supply circuit 30. In particular, the remote control 57 is configured for issuing a command (i.e., an appropriate wireless signal) for remote activation of the transducer 33 of the power supply circuit 30, in order to manage turning-on of the electrical appliance 49. The remote activation command can be generated by pressing an appropriate key, present on the remote control 57, which governs generation of the appropriate activation wireless signal. Such a wireless signal is, according with the described embodiment, a light beam having a wavelength and a power configured so as to control the phototransistor 36 in generation of an electrical current.

In some electrical devices of a known type, for example in some television sets, two supply circuits are present: a main power supply circuit, which supplies the electrical appliance as a whole during normal use (usually, for safety reasons, obtained with insulated topologies for example of a flyback type, forward type, resonant type, etc.) and an auxiliary power supply circuit, used in the step of turning-on of the electrical appliance and in stand-by mode. Separate implementation of the main power supply circuit and of the auxiliary power supply circuit guarantees a better energy efficiency, but at a higher cost. The turn-on circuit 32 according to an embodiment of the present invention can be implemented indifferently in a main power supply circuit or in an auxiliary power supply circuit. However, by implementing the turn-on circuit 32 according to an embodiment of the present invention in a main power supply circuit a high energy efficiency, a high level of integration of the components, and reduced production costs are guaranteed simultaneously.

The electrical appliance 49 of FIG. 6 is supplied by means of a main power supply circuit 30 connected to the supply port 2, which is, in turn, connected, for example, to the mains supply (e.g., household power line). The electrical appliance 49 comprises: the microcontroller 5, which is connected to the power supply circuit 30 from which it receives the supply, and communicates with the command sensor 6; a sound-reproducing circuit 51, which is connected to the power supply circuit 30 from which it receives the supply, and communicates with the microcontroller 5 and with one or more loudspeakers 55; optionally a memory 52, which is connected to the power supply circuit 30 from which it receives the supply, and communicates with the microcontroller 5, for storing possible programming information of the electronic appliance 49; and, optionally, a video-reproducing circuit 53, which is connected to the power supply circuit 30 from which it receives the supply, and communicates with the microcontroller 5 and is configured for managing display of graphic information or images on a display 54. The sound-reproducing circuit 51, the memory 52, the video-reproducing circuit 53, the display 54, and the loudspeakers 55 can be supplied by means of respective secondary windings (not illustrated) of the transformer 11 of the power supply circuit 30 of FIG. 3.

From an examination of the characteristics of the switch-mode power supply circuit provided according to the present invention the advantages that it makes possible are evident.

In particular, it is possible to eliminate the electric-power consumption of electrical or electronic appliances in stand-by mode, without losing the convenience of turning-on via remote control of the electrical or electronic appliance itself.

Furthermore, the time necessary for turning-on is of the order of a few hundreds of milliseconds, practically negligible for human perception.

Finally, it is clear that modifications and variations may be made to the switch-mode power supply circuit described and illustrated herein, without thereby departing from the sphere of protection of the present invention, as defined in the annexed claims.

For example, in order to limit the sensitivity of a transducer of an optical type (for example, a phototransistor) at a particular wavelength or within a range of wavelengths, it may prove advantageous to set an appropriate filter external to the phototransistor, configured so as to enable passage exclusively of the wavelength/wavelengths of interest.

Furthermore, according to the maximum voltage that the phototransistor sustains (depending upon the supply voltage $V_{AL}$), it may be expedient to connect a plurality of phototransistors 36 in series to one another.

In addition, the turn-on transistor 16 and the switching transistor 15 can be different from a MOSFET transistor; for example, they can be IGBT (insulated-gate bipolar transistor) devices or generic electronic switches.

Finally, the transducer 33 can be of a different type from what has been described. For example, it can be of an electromagnetic type, comprising an antenna and can be remotely activated by means of an electromagnetic signal.

Having thus described at least one illustrative embodiment of the invention, various alterations, modifications, and improvements will readily occur to those skilled in the art. Such alterations, modifications, and improvements are intended to be within the spirit and scope of the invention. Accordingly, the foregoing description is by way of example only and is not intended as limiting. The invention is limited only as defined in the following claims and the equivalents thereto.

What is claimed is:

1. A power supply circuit for an electrical appliance comprising:
   a charge storage element;
   a driving circuit coupled to said charge storage element and configured to selectively supply electrical power to the electrical appliance responsive to said charge storage element; and
   a turn-on stage comprising
      a turn-on transistor having a first conduction terminal coupled to a supply input, a second conduction terminal coupled to the charge storage element, and a control terminal, and a transducer coupled between the control terminal and the first conduction terminal of the turn-on transistor and configured to switch on said turn-on transistor to connect the supply input with the charge storage element responsive to a wireless signal.

2. The power supply circuit according to claim 1, wherein the turn-on stage further comprises a resistor; having a first conduction terminal coupled to the control terminal of the turn-on transistor and a second conduction terminal coupled to the second conduction terminal of the turn-on transistor.

3. The power supply circuit according to claim 1, wherein the turn-on stage further comprises a Zener diode having a first conduction terminal coupled to the control terminal of the turn-on transistor and a second conduction terminal coupled to the second conduction terminal of the turn-on transistor.

4. The power supply circuit according to claim 1, wherein the turn-on stage further comprises a resistor having a first conduction terminal coupled to the control terminal of the turn-on transistor and a second conduction terminal coupled to the first conduction terminal of the turn-on transistor.

5. The power supply circuit according to claim 1, wherein the transducer comprises an antenna.

6. The power supply circuit according claim 1, wherein the transducer comprises an optoelectronic device.

7. The power supply circuit according to claim 6, wherein the transducer comprises at least one phototransistor.

8. The power supply circuit according to claim 6, wherein the transducer comprises at least one photodiode.

9. The power supply circuit according to claim 8, wherein the transducer comprises at least another photodiode coupled in series to the at least one photodiode.

10. The power supply circuit according to claim 1, wherein the wireless signal comprises an electromagnetic signal.

11. The power supply circuit according to claim 1, said power supply circuit being of a switching type and further comprising:
a switching transistor having a control terminal coupled to said driving circuit;
a transformer having a primary winding coupled between the supply input of the power supply circuit and a reference voltage terminal through the switching transistor; and
at least a secondary winding coupled to an output of the power supply circuit.

12. An electrical appliance comprising:
a housing; and
a power supply circuit carried by said housing and comprising
a charge storage element,
a driving circuit coupled to said charge storage element and configured to selectively supply electrical power to the electrical appliance responsive to said charge storage element, and
a turn-on stage comprising
a turn-on transistor having a first conduction terminal coupled to a supply input, a second conduction terminal coupled to the charge storage element, and a control terminal, and
a transducer coupled between the control terminal and the first conduction terminal of the turn-on transistor and configured to switch on said turn-on transistor to connect the supply input with the charge storage element responsive to a wireless signal.

13. The electrical appliance according to claim 12, further comprising a microcontroller, coupled to an output of the power supply circuit and having a switching-off output coupled to the power supply circuit.

14. The electrical appliance according to claim 12, wherein the electrical appliance comprises at least one of a television set, a hi-fi component, a video recorder, and an electrical household appliance.

15. A power supply method for an electrical appliance having a power supply circuit comprising a charge storage element, a driving circuit coupled to the charge storage element, and a turn-on stage comprising a turn-on transistor having a first conduction terminal coupled to a supply input, a second conduction terminal coupled to the charge storage element, and a control terminal, and a transducer coupled between the control terminal and the first conduction terminal of the turn-on transistor, the method comprising:
switching on the turn-on transistor to connect the supply input with the charge storage element responsive to a wireless signal; and
selectively supplying electrical power to the electrical appliance using the driving circuit responsive to the charge storage element.

16. The method according to claim 15 wherein the wireless signal comprises an electromagnetic signal.

17. A turn-on system comprising:
a power supply circuit comprising
a charge storage element,
a driving circuit coupled to said charge storage element and configured to selectively supply electrical power to the electrical appliance responsive to said charge storage element, and
a turn-on stage comprising
a turn-on transistor having a first conduction terminal coupled to a supply input, a second conduction terminal coupled to the charge storage element, and a control terminal, and
a transducer coupled between the control terminal and the first conduction terminal of the turn-on transistor and configured to switch on said turn-on transistor to connect the supply input with the charge storage element responsive to a wireless signal; and
a remote control configured to generate the wireless signal.

18. A power supply circuit for an electrical appliance, comprising:
a turn-on circuit including a switching device adapted for coupling to a working voltage and a remote-controlled transducer configured to turn on the switching device in response to reception of a wireless signal;
a turn-on capacitor coupled to the switching device, wherein the turn-on capacitor is charged when the switching device is turned on by the remote-controlled transducer; and
a driving circuit coupled to the turn-on capacitor, wherein the driving circuit supplies operating power to a controller of the electrical appliance when a supply voltage is present on the turn-on capacitor.

19. A power supply circuit as defined in claim 18, wherein the remote-controlled transducer comprises as least one photodiode, at least one phototransistor or at least one antenna.

20. A power supply circuit as defined in claim 18, wherein the switching device comprises a transistor and wherein the remote-controlled transducer is coupled between a drain and a gate of the transistor.

21. A power supply circuit as defined in claim 18, wherein the switching device comprises a transistor and wherein the remote-controlled transducer is coupled between a source and a gate of the transistor.

22. A power supply circuit as defined in claim 18, wherein the switching device comprises a transistor and wherein the turn-on circuit further comprises a Zener diode coupled between a gate of the transistor and a main conduction terminal of the transistor.

23. A power supply circuit as defined in claim 18, wherein the driving circuit is configured to turn off the operating power in response to receiving a turn-off signal from the controller.

24. A method for supplying power to an electrical appliance, comprising:
   providing a switching device coupled between a working voltage and a turn-on capacitor, and a remote-controlled transducer coupled to the switching device;
   turning on the switching device in response to reception by the remote-controlled transducer of a wireless signal;
   charging the turn-on capacitor when the switching device is turned on by the remote controlled transducer; and
   supplying, by a driving circuit, operating power to a controller of the electrical appliance when a supply voltage is present on the turn-on capacitor.

25. A method for supplying power as defined in claim 24, wherein the remote controlled transducer comprises at least one photodiode, at least one phototransistor or at least one antenna.

26. A method for supplying power as defined in claim 24, wherein supplying operating power is terminated in response to the driving circuit receiving a turn-off signal from the controller.

* * * * *